Nov. 15, 1949  J. M. BOWEN  2,487,847
ADJUSTABLE GAUGE WHEEL SUPPORT
Filed Sept. 18, 1946
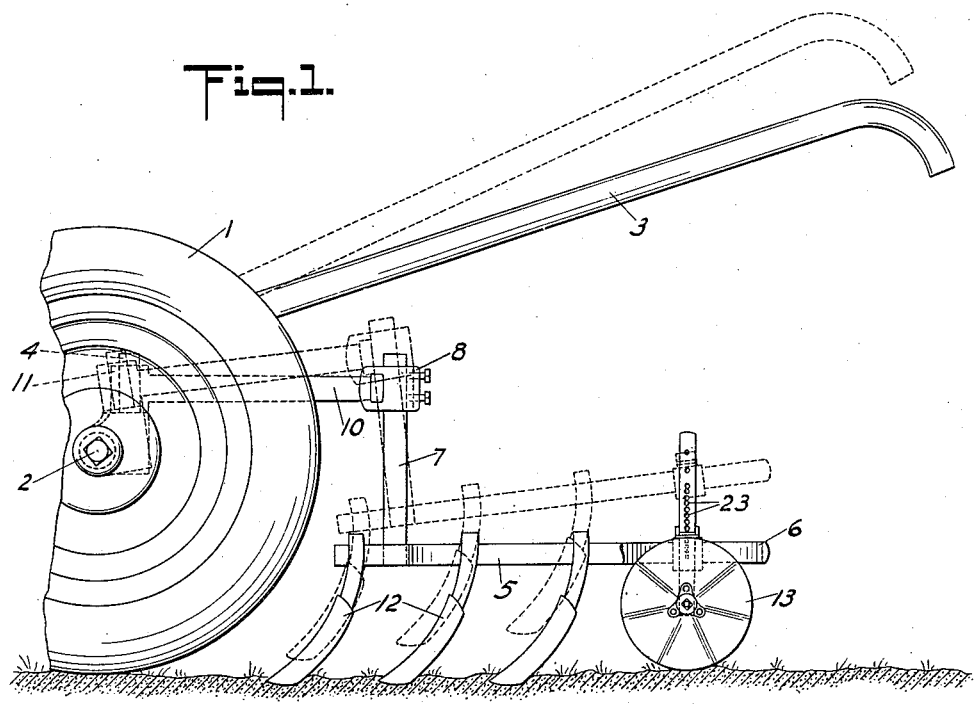
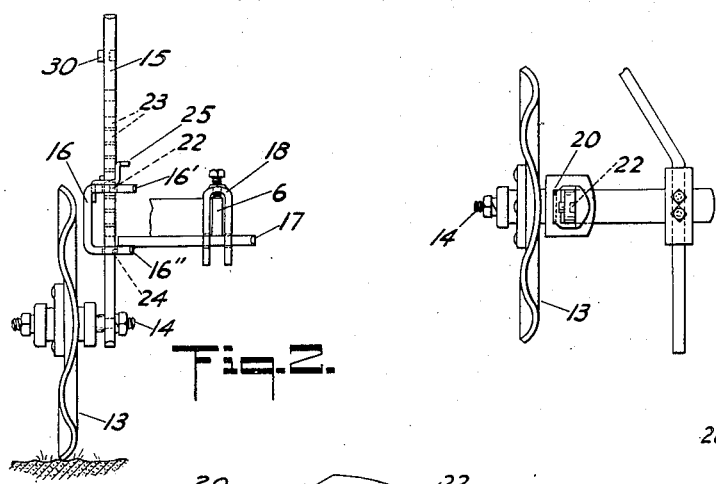
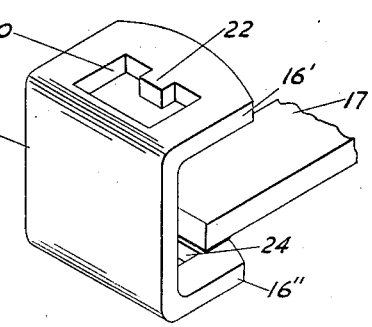
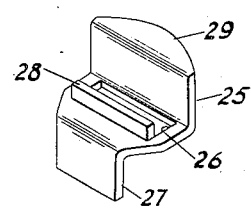
INVENTOR
JAMES M. BOWEN
BY
ATTORNEY Patented Nov. 15, 1949

2,487,847

UNITED STATES PATENT OFFICE 2,487,847

ADJUSTABLE GAUGE WHEEL SUPPORT

James M. Bowen, Cape May Court House, N. J., assignor to S. L. Allen & Co., Inc., Philadelphia, Pa., a corporation of Pennsylvania Application September 18, 1946, Serial No. 697,653

3 Claims. (Cl. 97—189)

My invention is directed to the provision of improved means for adjusting the height of the gage wheels of a garden tractor or the like with respect to its tool carrying gang bars.

Such tractors, especially in the smaller types, normally comprise a pair of ground wheels with an axle extending therebetween on which is supported a frame carrying the driving motor and from which upwardly and rearwardly extend the handles by which the tractor is guided, the frame and handles being thus movable as a unit in a vertical plane about the center of the axle. On the frame or axle midway between the wheels is located a king bolt over which a vertically elongated eye at the front end of the tool carrying gang assembly is hooked and more or less adjacent the rear end of the gang bars comprised therein are disposed gage wheels which support the rear end of the assembly and determine the spacing of the gang bars from the ground, the cultivating tools normally being secured to the bars forwardly of these wheels and thus between them and the axle. Consequently by increasing or decreasing the distance between the axes of the gage wheels and the superjacent gang bars the cultivating tools can be caused to enter the ground to a greater or less degree without changing their respective vertical adjustment on the bars or even caused to clear the ground entirely as when the tractor is being moved to or from the place at which it is to be used.

Hitherto the standards near the bottoms of which the gage wheels are supported either have been clamped rigidly to the bars thus requiring the loosening and re-tightening of the clamps to change the distance between the bars and wheels or in lieu of clamps some means designed to facilitate this adjustment has been provided, but as far as I am aware, all such means have been open to various objections under practical conditions of operation or have been so complicated and expensive to manufacture as to be unsatisfactory.

U. S. Letters Patent 2,381,202, issued August 7, 1945, to J. M. Bowen and C. J. Allen discloses an improvement in adjustable gage wheel supports but this, like some of the other mechanisms just referred to, relies for rigidity in the connection between the gage wheel standard and the bar supported therefrom upon a spring pressed dog engageable with the standard to hold it in fixed relation to the bar.

In such mechanisms under the conditions to which they are necessarily subjected in the field it is substantially impossible always to keep all the holes provided for receiving the dog free of obstructions tending to prevent its ready entry thereinto, as they often become clogged with soil, rust or the like so that when they are to be used they must be first cleared out to enable the dog to enter, its spring usually not being strong enough to force it into a clogged hole.

Moreover, the gang assembly as a whole is subject to extreme vibration and irregular motion when in use which imposes severe duty on the springs; when as a result a spring breaks or is so weakened that its tension against the dog relaxes the latter may become dislodged from its normal position and permit the wheel carrying standard to fall.

It is therefore a principal object of this invention to provide an adjustable gage wheel support comprising a boss engageable selectively in any one of a series of holes in the gage wheel standard to thereby determine its adjusted position yet which is rigid and integral with the yoke securing the standard to the bar in conjunction with a latch slidable on the standard for positively retaining the boss and standard in interlocked relation even under severe conditions of vibration and irregular motion.

A further object is to provide a support of this character in which the rigid boss automatically clears debris and the like from any hole in the standard in which it is desired to enter it as the leverage available to cause the boss to enter even a densely clogged hole is sufficient to force out easily even tightly wedged or caked soil, rust or other foreign matter, while positive locking means keep the boss and standard rigidly locked together except while an adjustment is being made.

Another object is to provide improved adjustable gage wheel supporting mechanism which is extremely simple and inexpensive to manufacture, is devoid of intricate or delicate parts, comprises a minimum of moving parts of any description and none depending for its effectiveness upon a spring or other element likely to break or become fatigued through use, and which is effective to hold the gage wheel and gang bar rigidly in adjusted relation but is readily manipulated to permit any desired change in such relation over a wide range of different adjustments.

Other objects and novel features of design, construction and arrangement comprehended by the invention are hereinafter more particularly mentioned or will be apparent to those skilled in the art from the following description of one form thereof as illustrated in the accompanying drawing.

Since the invention is of particular utility in connection with a garden tractor of the character to which general reference has been made I shall describe it in association with such a tractor but not by way of limitation or restriction of the invention thereto as it may be employed to advantage with other agricultural implements and the like.

In the said drawing,

Fig. 1 is a side view of a garden tractor equipped with mechanism embodying the invention with parts of the tractor proper shown in a conventional manner;

Fig. 2 is a fragmentary rear elevation on a larger scale of a portion of one of the tractor gang bars and of the gage wheel assembly supporting it;

Fig. 3 is a plan view thereof;

Fig. 4 is a perspective view on a still larger scale of the standard-retaining latch removed from the assembly; and Fig. 5 is a similarly enlarged fragmentary perspective showing the standard-receiving yoke, but with the standard and latch removed, like characters of reference being used to designate the same parts in the several figures.

Referring first to Fig. 1, the tractor comprises the customary ground wheels 1, axle 2, rearwardly extending divergent handles 3 and a vertically extending king bolt 4 supported on the axle or some convenient portion of the frame (not shown). In general the gang assembly, which is detachable from the tractor, includes a pair of rearwardly extending laterally spaced gang bars 5, 6 near the front end of each of which is a vertical standard 7 adjustably secured as by a clamp 8 to a transversely extending bar from which a pair of inwardly converging bars 10 project to meet in a socket 11 which is hooked over the king bolt when the gang is operatively associated with the tractor, the cultivating or other tools 12 being removably secured to bars 5, 6 at longitudinally spaced intervals by suitable clamping means (not shown). Adjacent and below the rear end of each of the gang bars 5, 6 is located a gage wheel 13, that shown in the drawing being associated with the right hand gang bar on the far side of the machine, bar 5 on the near side being broken away and the gage wheel normally associated therewith omitted entirely for convenience of illustration; these wheels are customarily fluted and afford support to and also steady the rear end of the gang assembly when the tractor is in operation. It will be appreciated that the various parts of which mention has just been made are commonly found in garden tractors but as they form no part of the present invention their specific design and arrangement is a matter of choice.

I shall now refer more particularly to the manner in which, in accordance with the invention, I arrange these wheels for adjustment with respect to the gang bars to which they are operatively attached, and as the means employed are similar for each wheel a description of one of the assemblies will apply equally to the other. Thus, each wheel is rotatably mounted on a transversely extending axle 14 in any convenient way and the axle is rigidly secured to the lower end of an upwardly projecting standard 15 which in turn is adjustably secured to the adjacent gang bar in the manner now to be described. Standard 15 is preferably made of a flat bar with its longer transverse dimension disposed at right angles to axle 14 and thus when assembled with the gang lies parallel to the longitudinal axis of the tractor as a whole, and above the axle it passes slidably through appropriate slots in the arms of a generally U-shaped yoke 16 normally so positioned that the free ends of its arms project in a generally lateral direction. This yoke is likewise desirably made of flat stock and its bridge portion extending between its upper and lower arms 16', 16'' is made long enough to space the arms sufficiently to afford adequate support to the standard which, as stated, slidably passes through them. Preferably to the lower arm is welded or otherwise suitably secured a laterally extending wing 17 through the medium of which the yoke and parts carried thereby can be removably attached to the gang bar, in this instance gang bar 6, as by a clamp 18 of appropriate design. In the drawing one wheel carrying assembly is shown attached to bar 6 in such manner that the wheel lies inside the bar and of course the other assembly is correspondingly attached to bar 5, but it will be apparent that if it is desired to locate the gage wheels outside the bars instead of inside the respective assemblies can readily be transposed from one bar to the other so that wings 17 will project inwardly rather than outwardly.

The upper arm 16' of yoke 16 is provided with a generally rectangular slot 20 slightly longer than the width of standard 15 and appreciably wider than its thickness, and has projecting inward from one of its lateral edges a boss 22 adapted to enter any selected one of a series of holes 23 in the standard for holding the latter in vertically adjusted position in the yoke. The lower arm of yoke 16 is also provided with a slot 24 of the same length as slot 20 but somewhat narrower so as to receive standard 15 fairly snugly but with sufficient clearance to permit the standard to be swung laterally the amount necessary to clear any hole 23 from boss 22 while an adjustment is being made.

For locking the standard in position and to prevent accidental disengagement of boss 22 from the hole 23 in which it may be seated, I employ a latch, generally designated 25 and best shown in Fig. 4, preferably formed from a single piece of metal and having a slot 26 loosely receiving standard 15 to enable the latch to slide freely along the latter. The latch carries a depending lip 27 paralleling slot 26 and adapted to enter slot 20 in arm 16', the lip being spaced from the adjacent edge of slot 26 a distance substantially equal to the difference between the width of slot 20 and thickness of standard 15. Thus lip 27 can be entered in slot 20 only when the standard is positioned substantially vertically in the yoke with boss 22 fully entered in a hole 23, but when the boss is so entered and the lip engaged in the slot the latch firmly but releasably locks the standard in the yoke, an upstanding rib 28 at the edge of the latter, which may be formed by the metal displaced from slot 26, affording an adequate bearing surface for the latch against the standard. On the opposite side of the standard from rib 28 the latch is shaped to afford a projecting hand grip 29 by which it may conveniently be manually raised from or pressed into slot 20, while a projection 30 punched out of the standard near its upper end serves as a stop to prevent the latch being lifted entirely off the standard and perhaps lost.

Thus to make an adjustment of a gage wheel the latch 25 is first raised to retract lip 27 from the slot 20, which may be done manually or frequently very conveniently by the operator's foot, and often, especially when it is raised with the foot, the same operation partially or fully dislodges the boss 22 from its hole 23 through swinging the upper part of the standard laterally a short distance to the left in Fig. 2 using the edge of lower slot 24 as a fulcrum. The standard can then easily be swung further if required, and while disengaged from boss 22 moved longitudinally in either direction relatively to the yoke and in a plane at a slight angle to the plane of its normal relation thereto.

When the desired position has been reached the upper end of the standard is again swung laterally, this time in the opposite direction, causing boss 22 to enter whichever hole 23 is aligned therewith, and as it reaches its normal position the latch may slide of its own weight into slot 20, or possibly only partially so with but the edge of lip 27 entered in the slot. The latch is thereafter pressed fully home, either by hand or with the foot to fully seat it and thereby maintain the standard in fixed vertical relation to the yoke with the boss 22 which, as noted, is integral with the latter now firmly locked in a hole 23. The latch not being dependent on a spring to hold it in position, and in fact having but a secondary function in maintaining the fixed adjustment of the standard and yoke, being useful primarily for holding the standard upright in the latter and thereby keeping boss 22 seated in a hole 23, does not ordinarily receive any appreciable force or stress tending to dislodge it accidentally from its position, and it is therefore not essential that it be wedged tightly into the slot 20, or even so constructed that it can be wedged thereinto, but it will be apparent that if desired it may be so proportioned to the other parts of the assembly that considerable force will be required to fully seat it and/or to dislodge it. This is usually unnecessary, however, and I prefer to provide a fairly snug but not a tight fit among these parts, as frequent changes in adjustment of the standard are sometimes required and these are facilitated by making the latch so it can be moved comparatively easily but still remain firmly in place when not intentionally dislodged therefrom. Now since the depth the cultivating tools 12 enter the ground after they are secured to the gang bars in proper position is largely determined, within limits, by the distance between the gage wheel axles and the bars, it is a very simple matter to vary this distance in the manner just described and thus cause the points of the tools to enter the ground more or less deeply as desired. Preferably, therefore, the holes in the standard are arranged approximately as indicated in the drawing, that is, a series of rather closely spaced ones are provided about midway between the ends of the standard so that by moving the boss from one hole to another in this group a relatively fine adjustment can be secured, while another hole is placed near the top of the standard and used when it is desired to lift the tools entirely clear of the ground as indicated in dotted lines in Fig. 1 to enable the tractor to be moved about on its wheels from place to place without the tools contacting the ground. Of course, when it is desired to so raise the whole gang assembly relatively to the gage wheels to dotted line position of Fig. 1 the parts are manipulated to enter the bosses on the yokes respectively in the uppermost holes in the standards, the projections or stops 30 being effective to avoid removal and consequent possible loss of the latches and, through engagement with the latter, to prevent either standard sliding entirely out of its yoke at any time. Of course, if it ever is desired to remove the standard from the yoke, this can readily be accomplished by first removing axle 14 from the standard, after which, with latch 25 retracted, the standard can be lifted entirely out of the yoke, and the latch can then be slid off its lower end.

Under conditions of practical operation it has been found that the invention is of great utility and a decided improvement over any of the devices with which I am familiar heretofore proposed for a like purpose. The parts are simple, can be of rugged construction, are not liable to break or get out of order when in use and can be rapidly and effectively manipulated in the field.

It will of course be appreciated that while I have herein described and illustrated one form of the invention with considerable particularity, I do not thereby desire or intend to specifically limit or restrict myself thereto as the design, construction and method of assembly of the various instrumentalities employed may be varied in numerous particulars if desired within the scope of the appended claims.

Having thus described my invention, I claim and desire to protect by Letters Patent of the United States:

1. A gage wheel assembly for a tractor gang bar or the like comprising a yoke having spaced upper and lower horizontal slotted arms and a vertical connecting portion, the slot in one arm being of substantially greater width than that in the other and both slots being of substantially equal length, a boss integral with the yoke projecting into the wider slot, a wing projecting from the yoke in substantial prolongation of one of said arms for securing the yoke to the gang bar, a wheel-carrying standard extending vertically thru the slots having a series of holes adapted selectively to receive said boss, a gage wheel rotatably carried by the lower end of the standard, and a latch embracing and movable on the standard comprising an upwardly projecting rib paralleling and adapted to engage an adjacent surface of the standard and a lip transversely spaced from but parallel to the rib depending from the latch and adapted to enter said wider slot when the boss is entered in one of said holes to thereby releasably lock the yoke and standard together.

2. A gage wheel assembly adapted for securement to a tractor gang bar or the like and comprising a vertical yoke providing spaced upper and lower horizontal arms having substantially vertically aligned slots of substantially equal length and unequal width and a boss projecting into the wider slot from a lateral edge thereof aligned with the corresponding edge of the other slot, a standard extending thru said slots having a series of holes adapted selectively to receive the boss, a gage wheel rotatably secured to the lower end of the standard and a latch embracing and slidable along the standard having a depending lip adapted to enter said wider slot when the boss is entered in a hole in the standard to thereby releasably secure the standard in substantially fixed relation to the yoke.

3. Gage wheel standard supporting and adjusting means comprising a yoke adapted for securement to a gang bar and having spaced substantially parallel arms respectively provided with rectangular slots of unequal width, and a boss projecting into one of said slots from a lateral edge thereof, a standard extending through both slots having a series of holes selectively adapted to receive the boss, the standard being slidable in the slots when inclined sufficiently to the plane of either arm to clear the boss from the holes, and a latch embracing and slidable on the standard and insertable in the wider slot when the boss is received in one of the holes to thereby hold the standard substantially normal to said plane.

JAMES M. BOWEN.

REFERENCES CITED

The following references are of record in the file of this patent:

UNITED STATES PATENTS

| Number | Name | Date |
|---|---|---|
| 906,693 | Cook | Dec. 15, 1908 |
| 2,381,202 | Bowen et al. | Aug. 7, 1945 |